June 18, 1957 M. GREENSPAN ET AL 2,796,522

CRYSTAL-CONTROLLED RELAXATION OSCILLATOR

Filed Aug. 21, 1953

INVENTOR
Martin Greenspan
Carroll E. Tschiegg
BY Howard L. Rose
AGENT

United States Patent Office 2,796,522

Patented June 18, 1957

2,796,522

CRYSTAL-CONTROLLED RELAXATION OSCILLATOR

Martin Greenspan and Carroll E. Tschiegg, Silver Spring, Md., assignors to the United States of America as represented by the Secretary of Commerce Application August 21, 1953, Serial No. 375,841

4 Claims. (Cl. 250—36)

(Granted under Title 35, U. S. Code (1952), sec. 266)

The invention described herein may be manufactured and used by or for the Government of the United States for governmental purposes without the payment to us of any royalty thereon in accordance with the provisions of 35 United States Code (1952) section 266.

The present invention relates to relaxation oscillators and in particular to a method and apparatus for stabilizing the frequency of relaxation oscillators by means of a piezoelectric crystal.

In the prior art numerous attempts have been made to stabilize the frequency of various types of relaxation oscillators. In the case of the blocking oscillator, Marrison, Patent No. 1,919,795, provides a crystal-stabilizing circuit. However, since the division ratios obtainable with this circuit were rather small and the range of frequencies limited, the circuit was not widely used. In the case of multivibrators, which are inherently frequency unstable, stability has been provided by synchronizing the frequency by means of an oscillatory voltage coupled into the circuit from an external oscillator. The use of an external oscillator of necessity increased the complexity of the circuits.

The primary cause of frequency instability of relaxation oscillators arises from the fact that the time of firing of the oscillator tube is controlled by the rate of discharge of a capacitor in the grid circuit of the tube. As long as the firing of the tube takes place at a voltage which lies along the steep portion of the discharge curve, the frequency stability is acceptable. However, if the frequency is varied so that firing of the oscillator tube is to occur at a voltage which lies along the flat portion of the discharge curve, the frequency stability becomes very poor. This is due to the fact that along the flat portion of the discharge curve the variation in voltage from instant to instant is almost infinitesimal. In order for a tube to fire at exactly the same potential during each cycle and therefore at the same time the tube characteristics would have to remain just about constant which, of course, is impossible.

It is the primary object of the present invention to provide a simple method of and apparatus for crystal-stabilizing the frequency of various types of relaxation oscillators.

It is another object of the present invention to provide for crystal stabilization of relaxation oscillators having high division ratios.

It is another object of the present invention to provide crystal-controlled relaxation oscillators in which the frequency of the oscillator is synchronized with the frequency of the crystal.

It is another object of the present invention to provide crystal-controlled multivibrators in which the frequency of the oscillator is synchronized with the frequency of the crystal.

Another object of the present invention is to provide crystal-controlled relaxation oscillators which require only very minor modifications of the conventional oscillator circuit.

It is another object of the present invention to provide a crystal controlled relaxation oscillator, the output of which is relatively insensitive to variations in circuit parameters even at high division ratios.

It is another object of the present invention to provide a relaxation oscillator in which the voltages along the flat portion of the capacitor discharge curve are made to vary considerably from instant to instant.

It is another object of the present invention to provide a relaxation oscillator in which an oscillatory voltage with a constantly increasing amplitude is superimposed on the grid voltage of the oscillator tube or tubes. Further provision is also made to crystal stabilize the frequency of this oscillatory voltage.

It is a further object of the present invention to increase the frequency stability of relaxation oscillators when working along the steep portion of the timing wave form.

It is another object of the present invention to provide a multivibrator in which the various phases of an asymmetrical output wave are locked in by a piezoelectrical crystal.

In accordance with the preferred embodiment of the present invention there is provided a multivibrator, the output frequency of which is synchronized with a harmonic or subharmonic of a piezoelectric crystal. The piezoelectric crystal is coupled into the grid circuit of the multivibrator, the crystal and the tube acting as a crystal oscillator immediately prior to the firing of the tube in whose grid circuit the crystal is coupled. In addition to the crystal oscillator the circuit resonates as a low-Q amplitude-unstable oscillator, whose frequency is locked on some harmonic or subharmonic of the crystal frequency. Because the low-Q oscillator is amplitude unstable, successive oscillations of this circuit will produce output voltages of increasing amplitude, the firing of the tubes of the multivibrator being controlled by one of these voltage peaks. Since the amplitude of these peaks is increasing rapidly, particularly during the period just before firing, the circuit can easily differentiate between successive voltage peaks.

Other uses and advantages of the invention will become apparent upon reference to the specification and drawings.

It should be noted that the use of a crystal to stabilize blocking oscillators is not specifically claimed in this application, but the explanation of that circuit is included for the purpose of developing the overall concepts involved. The crystal-controlled blocking oscillator is specifically claimed in co-pending application No. 376,770, filed on August 26, 1953, by Moody C. Thompson, Jr., now U. S. Patent 2,761,971.

Figures 1, 2:
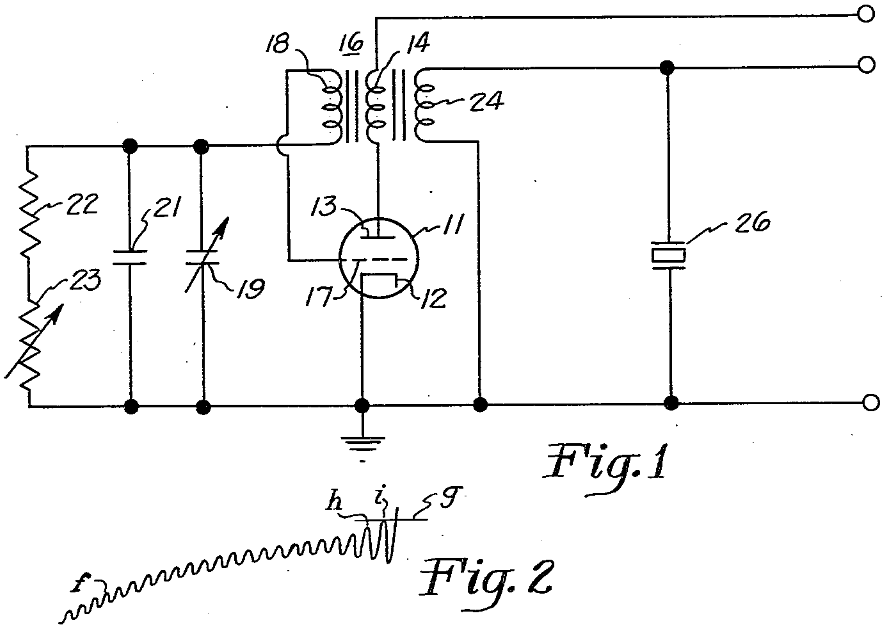
Figure 1 is a circuit diagram of a crystal-controlled blocking oscillator.
Figure 2 is a series of reproductions of pictures taken from the face of a cathode-ray-oscilloscope, showing the various wave forms obtained on the grid of the oscillator tube.

Referring to Figure 1, the tube 11 has its cathode 12 grounded and its plate 13 connected through one winding 14 of the pulse transformer 16 to the B+ supply. The grid 17 of the tube is connected through another winding 18 of the pulse transformer and through the variable capacitor 19 to ground. The capacitor 19 is shunted by the fixed capacitor 21 and the series combination of the fixed resistor 22 and variable resistor 23. A third winding 24 of the transformer 16 has one terminal connected to ground and the other terminal connected through the crystal 26 to ground.

Assuming initially that the blocking oscillator has just fired, the grid 17 is instantaneously driven very highly positive and then very sharply negative. The negative bias on the grid shuts off the tube, and this negative charge is stored in the capacitors 19 and 21, thereby maintaining the tube in the biased-off condition. However, the capacitors gradually discharge through the resistors 22 and 23, and the potential on the grid 17 rises along the exponential discharge curve of the capacitors. When the grid has reached a potential at which the tube can again fire, a large pulse is given out by the oscillator, the grid again being instantaneously driven very highly positive and then very highly negative. Owing to the very tight coupling of the pulse transformer the crystal and tube combine to form an oscillator which will oscillate for a brief period before the firing of the blocking oscillator. Initially the crystal is caused to ring as the result of the large output pulse supplied to it but since the tube is biased almost to cutoff by the large negative charge stored across the capacitors 19 and 21, the tube cannot cooperate with the crystal to produce a true oscillator. However, since no tube is cut off 100 percent by the normal biases which are applied to the grid, the tube will begin to conduct to a very small extent as the bias on the grid rises. That is, before the tube actually fires and causes the blocking oscillator to produce an output pulse, there will be some conduction through the tube, which conduction is sufficient to cause the crystal and tube to act as an oscillator. These oscillations will continue, until the tube again fires, and are superposed on the grid voltage. In addition to the crystal oscillator the winding 18 in conjunction with the tube and feedback circuit form a second oscillator, the winding 18 and its stray capacitances acting as a tank circuit for this oscillator. This low-Q oscillator produces what will hereinafter be called the characteristic oscillation of the blocking oscillator circuit. Since the Q of the tank circuit is very low, pulse transformers necessarily having low-Q windings, this oscillator is amplitude-unstable, and the amplitude of the oscillations rise sharply as the capacitor discharges. This is due to the steady increase of the transconductance of the tube in conjunction with the low-Q of the tank circuit, the increase in transconductance resulting from the decrease of bias on the grid of the tube as the capacitor discharges. This circuit oscillates at a characteristic frequency which is determined by the resonant frequency of the low-Q tank and breaks into oscillation prior to actual firing of the tube, this voltage also being superposed on the grid voltage. These oscillations of the low-Q circuit are synchronized with the crystal oscillations, thereby providing for frequency stability of this oscillator. However, as pointed out above, the low-Q oscillator is amplitude-unstable, the amplitude of the oscillatory voltage increasing by as much as several volts per cycle.

As a result of the above, the grid 17 of the tube has impressed upon it three distinct voltages, the gradual increase of voltage as the capacitor discharges, the oscillatory voltage of the crystal oscillator, and the oscillatory voltage of the low-Q oscillator. In other words, there is a regenerative build-up of an oscillatory voltage at a frequency which is characteristic of the particular circuit, which voltage is superposed on a timing wave form of the grid and serves to trigger the transition. At the same time the characteristic oscillation is synchronized with the oscillations of the crystal, which in conjunction with the tube acts briefly as a crystal oscillator once each cycle of relaxation.

The high degree of stability of the frequency of this blocking oscillator even at high division ratios is due to the increase in amplitude of the characteristic frequency cycle by cycle. This can be shown by referring to Figure 2. The overall shape of the wave is controlled by the discharge or exponential curve of the capacitor. Superposed on the capacitor-discharge wave is the characteristic frequency voltage of the low-Q oscillator (curve *f*) which, as can be seen, builds up cycle by cycle. The curve *g* represents the grid potential at which the tube will fire, thereby producing an output pulse from the blocking oscillator. It will be noted that the magnitude of each positive peak, such as *h* and *i*, increases considerably over the prior positive peak and therefore makes it possible to differentiate between one pulse and the next succeeding or prior pulse even when operating on the flat portion of the timing wave form.

The frequency of the blocking oscillator is controlled by varying the discharge time of the capacitor 19. Rough adjustments may be made by varying the value of resistor 23. This oscillator was found to have a high degree of frequency stability at even large division ratios.

It will be noted in the above analysis that several voltages are applied to the grid-to-cathode circuit of the tube. These voltages include a crystal oscillator voltage and a low-Q oscillator voltage, both of which appear in the aforementioned grid-to-cathode circuit.

Figure 3:
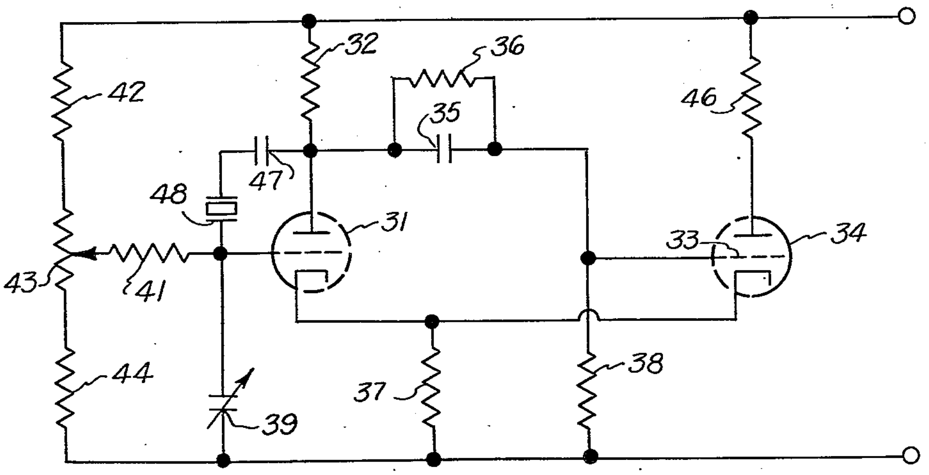
Figure 3 is a circuit diagram of a multivibrator which is crystal controlled.

Referring now to the preferred embodiment of the present invention which is a crystal-controlled multivibrator, as shown in Figure 3, there is provided a tube 31 which has its plate connected to B+ through resistor 32 and to the grid 33 of the tube 34 through the parallel combination of the resistor 36 and capacitor 35. The cathodes of the tubes are connected to ground through the common resistor 37. The grid 33 is grounded through the resistor 38. The grid of the tube 31 is grounded through the variable capacitor 39 which is shunted by the resistor 41 and a variable portion of the voltage divider made up of resistors 42, 43, and 44. The other end of the resistor 42 is connected to B+ as is the plate of the tube 34 through the resistor 46. The plate of the tube 31 is connected to the grid of the tube through the series combination of capacitor 47 and piezoelectric crystal 48. This circuit minus capacitor 47 and crystal 48 is a conventional cathode-coupled multivibrator. It operates in the following manner. If the left-hand tube has just started to conduct, the plate voltage of this tube will fall thereby driving the grid 33 of the tube 34 negative with respect to its cathode and this tube will be biased off. The fall in the plate voltage of tube 31 decreases the voltage impressed across the capacitor 35 which will now begin to discharge because of leakage through resistor 38. After a predetermined time, controlled by the time constant of the R-C circuit, the voltage on the grid 33 will rise sufficiently to allow the tube 34 to start to conduct. However, during the period of conduction of the tube 31, grid current was flowing through the capacitor 39, which current charged the capacitor negatively. Since the relative values of the plate resistors of the tubes 31 and 34 are chosen to be different, that of tube 34 being smaller, the tube 34 will draw a larger current than the tube 31. Therefore when the tube 34 conducts, the cathode voltages of the two circuits rise sharply and because of the negative charge accumulated on the capacitor 39, the tube 31 will be biased off. This will raise the voltage of the plate of the tube 31, thereby increasing the positive voltage on the grid 33 to cause the tube 34 to fully conduct. Since the current drawn by the tube 34 is larger than that drawn by the tube 31, as already pointed out, the cathode voltage of the tube 31 remains sufficiently high with respect to the initially charged condition of the capacitor 39 to maintain the tube nonconducting. However, the negative voltage across the capacitor 39 will gradually leak off along the exponential curve and will eventually reach a point where the tube 31 will again begin to conduct, starting the cycle again.

The frequency and stability of this type of circuit is, like that of the prior-art blocking oscillators, inherently poor. The reason, as previously explained, is because the grid voltage of the tube, or tubes, follows the discharge curve of a condenser. When the flat portion of the curve is reached, the change in voltage from instant to instant is exceedingly small. If the frequency of the oscillator, however, is to remain constant, the tubes must start conduction at precisely the same instant each cycle, which means that the exponential timing curve must remain identical from cycle to cycle, and the tube must respond to exactly the same voltage each time. This requires a degree of stability of the circuit parameters that is nearly impossible to obtain.

The present invention overcomes this difficulty in grid-controlled relaxation oscillators in general by superimposing on the exponential grid voltage an oscillatory voltage which constantly increases in amplitude and the frequency of which is stabilized by a piezoelectric crystal.

The circuit of Figure 3 with the crystal 48 connected as shown operates in a manner which is very similar to the operation of the blocking oscillator already described. It will be noted that both in the case of the blocking oscillator and the multivibrator there is a feedback circuit from the plate of a tube to its grid-to-cathode circuit. In the case of the blocking oscillator this is accomplished by means of the windings 14 and 18 of the pulse transformer 16 (see Figure 1) and in the present case it is accomplished—taking the tube 31 as the tube under discussion—by means of the coupling between the plate of the tube 31 and the grid 33 of tube 34 and cathode resistor 37 which again controls the voltages in the grid-to-cathode circuit.

Figure 4:
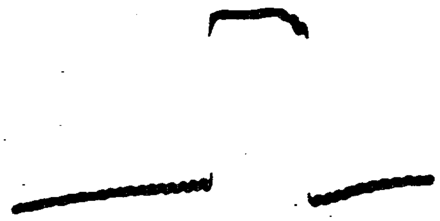
Figure 4 is a reproduction of pictures taken from the face of a cathode-ray-oscilloscope, showing the wave form at the output of the multivibrator.

In this circuit the crystal 48 and the multivibrator circuit act in a manner similar to a Pierce crystal oscillator over a narrow range of biases. Also it is found that the multivibrator has a characteristic frequency much in the same sense as that of the blocking oscillator. This frequency is determined by the circuit constants, stray inductances, and tube capacities, and is set for any particular circuit. This oscillator again acts as a low-Q oscillator which oscillates with a constantly increasing voltage amplitude for a brief period prior to conduction of either tube; that is, this oscillatory voltage and also that of the crystal oscillator will appear in the grid-to-cathode circuit of a tube immediately prior to conduction of that tube. This is clearly shown by the oscillograph which is reproduced in Figure 4. Unlike the oscillogram shown in Figure 2, this oscillogram is of the output voltage of the multivibrator, which is taken at the plate of the tube 34. It will be noted that the left-hand portion of the curve immediately preceding firing contains a constantly increasing oscillatory voltage, which voltage, it has been determined, is synchronized with the frequency of the crystal 48. The fact that this oscillatory voltage is constantly increasing allows the multivibrator to easily detect different peaks of this voltage and therefore the tube will fire on the same grid voltage peak and consequently at the same time each cycle.

Another feature of this circuit is that even when the multivibrator is used to produce an asymmetrical output voltage wave form both periods will lock on some subharmonic of the crystal frequency. The duration of the positive and negative portions of the output wave are controlled by the time constants of the circuits containing the capacitors 35 and 39. The capacitor 35 determines how long after the firing of tube 31, the tube 34 will fire and therefore determines the period of conduction of tube 31. Varying either the capacity of capacitor 35 or resistance of resistor 36 will then control the width of the positive portion of the output wave. Capacitor 39 similarly controls the period of conduction of tube 34 and varying the time constant of its circuit controls the width of the negative portion of the output wave. In this way it is possible to control the width of both portions of the wave and also the period of the oscillations.

When the output wave is made highly asymmetrical the voltage on the grid of one of the tubes just before firing will be varying along a very flat portion of the condenser's exponential curve. However, because of the presence of the crystal-stabilized amplitude-varying voltage on the grid of the tube each portion of the wave will be locked in.

It has been found possible to obtain division ratios of several hundred by means of the present invention and with high frequency crystals of even as high as 2000, with this circuit. At the higher division ratios, this circuit is not as insensitive to changes in circuit and tube parameters as the blocking oscillator described above. However, at the lower division ratios the two circuits are comparable. The use of the crystal in the multivibrator is not restricted to connections between the grid and plate of one of the tubes. The crystal may be inserted in other places for instance, between grid to ground.

This system for stabilizing grid-controlled relaxation oscillators has also been found to be applicable to screen-coupled astable phantastrons. The crystal may be connected from the plate to the suppressor or from the screen to the control grid of the tube. Division ratios of up to 100 can be obtained with this circuit.

It will be apparent that the embodiments shown are only exemplary and that various modifications can be made in construction and arrangement within the scope of our invention as defined in the appended claims.

What is claimed is:

1. A crystal-controlled relaxation oscillator comprising a grid-controlled electron tube having a cathode, a plate, and at least one grid, a direct-coupled low-Q regenerative feedback circuit including the stray parameters of said tube connected between the plate and grid of said tube to form an oscillator circuit therewith, said low-Q circuit having a natural frequency distinct from the relaxation frequency, a timing capacitor connected to the grid of said tube for applying a rising exponential voltage to said grid, a piezoelectric crystal having a natural frequency harmonically related to the natural frequency of said low-Q circuit coupled to the grid of said tube to form a Pierce oscillator circuit therewith, the Pierce oscillator and low-Q oscillator voltages derived from said oscillator circuits being superimposed on said exponential voltage as said exponential voltage nears the conducting value for said tube.

2. An oscillator as defined in claim 1 in which said crystal is connected between the plate and grid of said tube.

3. A crystal-controlled relaxation oscillator comprising first and second electron tubes each having a cathode, a plate, and at least one grid, means including, power supply means having its positive terminal resistively coupled to the plate of each tube, a common cathode resistor connected between said cathodes and the negative terminal of said power supply means, a first capacitor connected between the grid of said first tube and said negative terminal, a second capacitor connected between the plate of said first tube and the grid of said second tube, and the stray parameters of said tubes, whereby a direct-coupled low-Q regenerative feedback circuit is connected between the plate and grid of said first tube to form an oscillator circuit therewith, and a piezoelectric crystal coupled to the grid of said first tube to form a Pierce oscillator circuit therewith, said crystal having a natural frequency harmonically related to the natural frequency of said low-Q regenerative feedback oscillator circuit.

4. A relaxation oscillator as defined in claim 3 in which said crystal is connected between the plate and grid of said first tube.

References Cited in the file of this patent

UNITED STATES PATENTS

| | | |
|---|---|---|
| 2,070,647 | Braaten | Feb. 16, 1937 |
| 2,553,165 | Bliss | May 15, 1951 |
| 2,560,576 | Hoeppner | July 17, 1951 |

FOREIGN PATENTS

| | | |
|---|---|---|
| 251,782 | Switzerland | Sept. 1, 1948 |